US008587964B2

(12) United States Patent
Yang et al.

(10) Patent No.: US 8,587,964 B2
(45) Date of Patent: *Nov. 19, 2013

(54) CONTROL CIRCUIT WITH BURST MODE AND EXTENDED VALLEY SWITCHING FOR QUASI-RESONANT POWER CONVERTER

(75) Inventors: Ta-yung Yang, Milpitas, CA (US);
 Jung-Sheng Chen, Fongshan (TW);
 Chuh-Ching Li, Jhongli (TW);
 Chih-Hsien Hsieh, Dacun Township, Changhua County (TW)

(73) Assignee: System General Corp., Taipei Hsien (TW)

( * ) Notice: Subject to any disclaimer, the term of this patent is extended or adjusted under 35 U.S.C. 154(b) by 159 days.

This patent is subject to a terminal disclaimer.

(21) Appl. No.: 13/182,839

(22) Filed: Jul. 14, 2011

(65) Prior Publication Data

US 2012/0069608 A1 Mar. 22, 2012

Related U.S. Application Data

(60) Provisional application No. 61/383,499, filed on Sep. 16, 2010.

(51) Int. Cl.
 *H02M 3/335* (2006.01)
(52) U.S. Cl.
 USPC .......................................... 363/21.02; 363/97

(58) Field of Classification Search
 USPC ................................ 363/21.01–21.17, 97, 131
 See application file for complete search history.

(56) References Cited

U.S. PATENT DOCUMENTS

| | | | |
|---|---|---|---|
| 6,980,444 B2 * | 12/2005 | Takahashi | 363/21.18 |
| 7,426,120 B2 | 9/2008 | Yang et al. | |
| 8,339,813 B2 * | 12/2012 | Wang et al. | 363/21.02 |
| 2009/0141521 A1 * | 6/2009 | Yang | 363/49 |
| 2009/0175057 A1 * | 7/2009 | Grande et al. | 363/21.15 |
| 2012/0081084 A1 * | 4/2012 | Yang et al. | 323/235 |
| 2012/0230064 A1 * | 9/2012 | Yang et al. | 363/21.15 |

* cited by examiner

*Primary Examiner* — Jessica Han
(74) *Attorney, Agent, or Firm* — Muncy, Geissler, Olds & Lowe, PLLC

(57) ABSTRACT

A control circuit for power converter according to the present invention comprises a PWM circuit generating a switching signal coupled to switch a transformer of the power converter. A feedback input circuit is coupled to an output of the power converter for generating a feedback signal. The feedback signal is coupled to turn off the switching signal. A detection circuit is coupled to the transformer for generating a valley signal in response to a waveform of the transformer. A frequency-variation circuit is coupled to receive the feedback signal and the valley signal for generating a frequency-variation signal. The frequency-variation signal is coupled to turn on the switching signal. A burst circuit is coupled to receive the feedback signal for generating a burst signal to disable the switching signal.

18 Claims, 6 Drawing Sheets

CONTROL CIRCUIT WITH BURST MODE AND EXTENDED VALLEY SWITCHING FOR QUASI-RESONANT POWER CONVERTER

BACKGROUND OF THE INVENTION

1. Field of the Invention

The present invention relates to power converters, and more particularly, relates to the soft switching power converters.

2. Description of the Related Art

Flyback power converters have been widely used to provide power supplies for electronic products, such as home appliances, computers, battery charger etc. For achieving higher efficiency and reducing power loss, the power converter can be designed to operate at the quasi-resonant (QR) switching when the power converter is operated at high input voltage and high switching frequency. The quasi-resonant switching is preferred for reducing the switching losses and EMI. However, the drawback of the quasi-resonant power converter is its variable switching frequency. The quasi-resonant switching frequency is changed in response to the change of the input voltage and the output load. In many applications, the specific frequency bands are not acceptable due to the interference issue. The burst mode switching is an approach to avoid the specific switching frequencies.

The object of the present invention is to provide a control circuit that can adaptively operate the power converter at the quasi-resonant switching and the burst mode to achieve higher efficiency and prevent the system being interfered. The detail skills of the flyback power converter can be found in textbook, such as Keith H. Billings, "Switchmode Power Supply Handbook", McGraw-Hill Book Co. December 1989; and Abraham I. Pressman, "Switching Power Supply Design", McGraw-Hill Book Co., December 1991. The description of the QR power converter can be found in the prior art of "Switching control circuit having a valley voltage detector to achieve soft switching for a resonant power converter", U.S. Pat. No. 7,426,120.

BRIEF SUMMARY OF THE INVENTION

The object of the present invention is to provide a control circuit to adaptively operate a power converter at quasi resonant and burst mode.

The control circuit according to the present invention includes a PWM circuit generating a switching signal coupled to switch a transformer of the power converter. A feedback input circuit is coupled to an output of the power converter to generate a feedback signal. A frequency-variation circuit is coupled to receive the feedback signal for generating a frequency-variation signal. The frequency-variation signal is coupled to modulate the frequency of the switching signal. Thus, the frequency of the switching signal is modulated in response to the change of the feedback signal. A detection circuit is connected to the transformer for generating a valley signal in response to a waveform of the transformer. The valley signal is further coupled to the frequency-variation circuit to generate the frequency-variation signal for achieving a valley switching and an extended valley switching. Furthermore, a burst circuit generates a burst signal in accordance with a level of the feedback signal. The burst signal is coupled to disable the switching signal for the burst mode switching.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
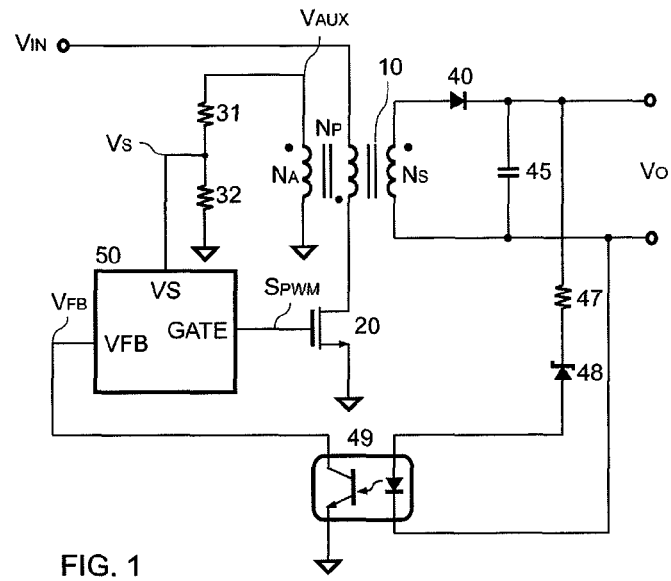
FIG. 1 shows a circuit diagram of a switching power converter.

FIG. 1 shows a circuit diagram of a switching power converter. A transformer 10 has an auxiliary winding $N_A$, a primary winding $N_P$, and a secondary winding $N_S$. One terminal of the primary winding $N_P$ is coupled to an input voltage $V_{IN}$. A power transistor 20 is coupled between the other terminal of the primary winding $N_P$ and a ground. The secondary winding $N_S$ generates an output voltage $V_O$ via a rectifier 40 and an output capacitor 45. One terminal of the secondary winding $N_S$ is coupled to one terminal of the rectifier 40. The output capacitor 45 is coupled between the other terminals of the rectifier 40 and the secondary winding $N_S$. The output capacitor 45 is also coupled to an output of the switching power converter for generating the output voltage $V_O$.

In order to regulate the output voltage $V_O$, a control circuit 50 generates a switching signal $S_{PWM}$ at an output terminal GATE to switch the transformer 10 via the power transistor 20. When the power transistor 20 is turned on, the input voltage $V_{IN}$ is applied to magnetize the transformer 10. A magnetizing current is therefore flowed through the primary winding $N_P$ of the transformer 10 and the power transistor 20. Once the switching signal $S_{PWM}$ is disabled and the power transistor 20 is turned off, the demagnetizing of the transformer 10 is started. The energy stored into the transformer 10 is delivered to the secondary winding $N_S$ and auxiliary winding $N_A$. Therefore, the enabling of the switching signal $S_{PWM}$ represents the magnetizing of the transformer 10. The disabling of the switching signal $S_{PWM}$ represents the start of the demagnetizing of the transformer 10. If the forward voltage of the rectifier 40 can be neglected, a reflected voltage $V_{AUX}$ of the auxiliary winding $N_A$ can be expressed as, $$V_{AUX} = \frac{N_A}{N_S} \times V_O \qquad (1)$$

where $N_A$ and $N_S$ are respectively the winding turns of the auxiliary winding $N_A$ and the secondary winding $N_S$ of the transformer 10.

A voltage divider formed by resistors 31 and 32 is connected between a detection terminal VS of the control circuit 50 and the auxiliary winding $N_A$ of the transformer 10 to detect the waveform of the reflected voltage $V_{AUX}$ of the auxiliary winding $N_A$ of the transformer 10. A detection voltage $V_S$ detected at the detection terminal VS of the control circuit 50 can be shown as, $$V_S = \frac{R_{32}}{R_{31} + R_{32}} \times V_{AUX} \qquad (2)$$

where $R_{31}$ and $R_{32}$ are respectively the resistance of the resistors 31 and 32.

Beside, the detection voltage $V_S$ is also related to a drain-to-source voltage $V_{DS}$ of the power transistor 20. Therefore, generating the switching signal $S_{PWM}$ in accordance with the detection voltage $V_S$ can achieve a valley switching for the power transistor 20. A feedback circuit including an opto-coupler 49 is coupled to the output voltage $V_O$ of the power converter via a resistor 47 and a zener 48. The resistor 47 is coupled to the output voltage $V_O$ of the power converter, and the zener 48 is coupled between the resistor 47 and the opto-coupler 49. The feedback circuit generates a feedback voltage $V_{FB}$ coupled to a feedback terminal VFB of the control circuit 50 to generate the switching signal $S_{PWM}$ for regulating the output voltage $V_O$ of the power converter.

Figure 2:
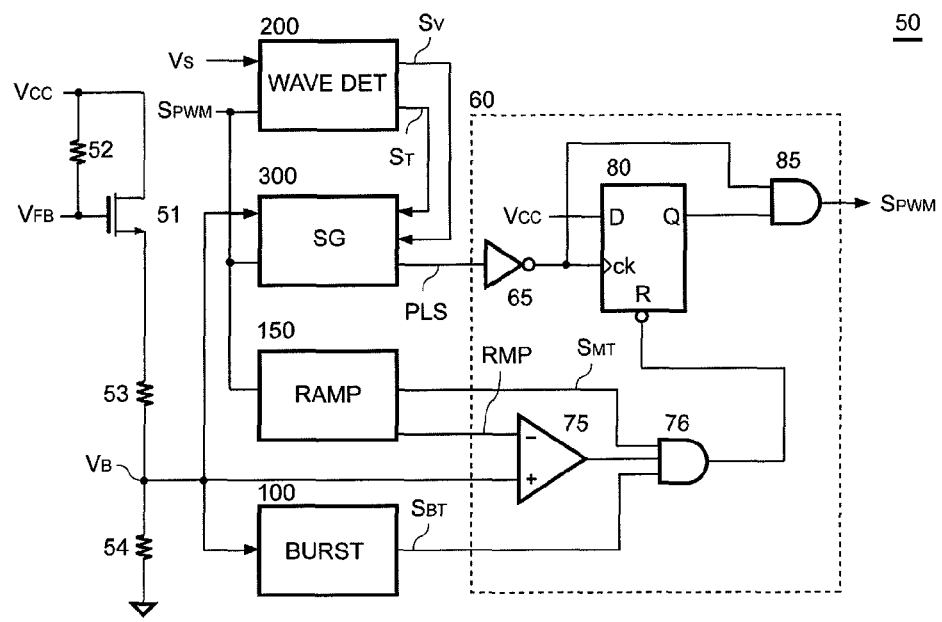
FIG. 2 shows a circuit diagram of a preferred embodiment of the control circuit in accordance with the present invention.

FIG. 2 shows a circuit diagram of a preferred embodiment of the control circuit 50 according to the present invention. It includes a PWM circuit 60 generating the switching signal $S_{PWM}$ coupled to switch the transformer 10 (shown in FIG. 1) of the power converter. A flip-flop 80, an AND gate 85, an inverter 65, an AND gate 76 and a comparator 75 develop the PWM circuit 60. A feedback input circuit coupled to the output of the power converter includes a transistor 51 and resistors 52, 53, 54 to provide the level shift for the feedback voltage $V_{FB}$ and generate a feedback signal $V_B$. The level of the feedback signal $V_B$ is correlated to the output load of the power converter.

The resistor 52 is coupled between a gate terminal of the transistor 51 and a drain terminal of the transistor 51. The drain terminal of the transistor 51 is further coupled to receive a supply voltage $V_{CC}$. The gate terminal of the transistor 51 is further coupled to receive the feedback voltage $V_{FB}$. One terminal of the resistor 53 is coupled to a source terminal of the transistor 51, and the resistor 54 is coupled between another terminal of the resistor 53 and the ground. The feedback signal $V_B$ is generated at a joint of the resistor 53 and resistor 54. A burst circuit (BURST) 100 receives the feedback signal $V_B$ to generate a burst signal $S_{BT}$ for disabling the switching signal $S_{PWM}$ when the level of the feedback signal $V_B$ is lower than a threshold $V_T$ including a hysteresis such as a first threshold $V_{TA}$ and a second threshold $V_{TB}$ (shown in FIG. 3).

A ramp signal circuit (RAMP) 150 generates a ramp signal RMP and a maximum on-time signal $S_{MT}$ in response to the switching signal $S_{PWM}$. A clock input CK of the flip-flop 80 is coupled to receive a frequency-variation signal PLS through the inverter 65 for turning on the switching signal $S_{PWM}$. The frequency-variation signal PLS is generated by a frequency-variation circuit (SG) 300. The inverter 65 is coupled between the frequency-variation circuit 300 and the clock input CK of the flip-flop 80. An input D of the flip-flop 80 is coupled to receive the supply voltage $V_{ic}$. A first terminal of the AND gate 76 receives the maximum on-time signal $S_{MT}$.

The ramp signal RMP is supplied with a negative input of the comparator 75. A positive input of the comparator 75 is coupled to the output load of the power converter for receiving the feedback signal $V_B$. The comparator 75 is coupled to receive the feedback signal $V_B$ and the ramp signal RMP for generating a reset signal. The ramp signal RMP associates with the feedback signal $V_B$ to achieve the pulse width modulation for the switching signal $S_{PWM}$. In other words, the feedback signal $V_B$ is coupled to turn off the switching signal $S_{PWM}$. A second terminal of the AND gate 76 is coupled to an output of the comparator 75. A third terminal of the AND gate 76 receives the burst signal $S_{BT}$. An output of the AND gate 76 generating the reset signal is coupled to a reset terminal R of the flip-flop 80 to reset the switching signal $S_{PWM}$. The switching signal $S_{PWM}$ is switched off in response to the reset signal. Therefore, the maximum on-time signal $S_{MT}$ is coupled to the AND gate 76 to limit the maximum on-time of the switching signal $S_{PWM}$.

A detection circuit (WAVE DET) 200 is coupled to the transformer 10 through the detection terminal VS and the voltage divider (shown in FIG. 1) to receive the detection voltage $V_S$ for generating a valley signal $S_V$ and a discharge-time signal $S_T$ in response to the waveform of the transformer 10. The voltage divider is formed by the resistors 31 and 32 connected to the detection terminal VS of the control circuit 50. The valley signal $S_V$ is generated through the voltage divider coupled to the transformer 10. The detection circuit 200 is further coupled to receive the switching signal $S_{PWM}$. The frequency-variation circuit 300 is coupled to receive the switching signal $S_{PWM}$, the feedback signal $V_B$, the valley signal $S_V$ and the discharge-time signal $S_T$ for generating the frequency-variation signal PLS. The frequency-variation signal PLS is coupled to turn on the switching signal $S_{PWM}$ by clocking the flip-flop 80. An output Q of the flip-flip 80 is connected to one input of the AND gate 85 for generating the switching signal $S_{PWM}$. Another input of the AND gate 85 is coupled to the frequency-variation signal PLS through the inverter 65 to limit the maximum duty of the switching signal $S_{PWM}$.

Figure 3:
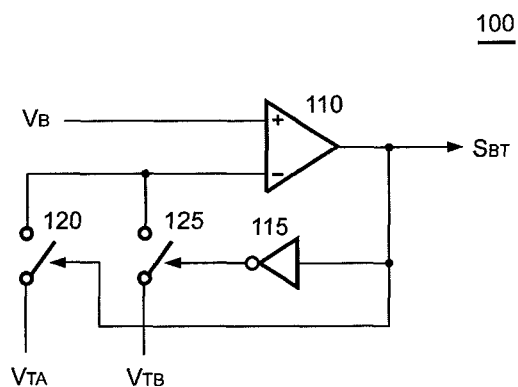
FIG. 3 shows a circuit diagram of a preferred embodiment of the burst circuit in accordance with the present invention.

FIG. 3 shows a circuit diagram of a preferred embodiment of the burst circuit 100 according to the present invention. The burst circuit 100 includes a comparator 110, an inverter 115 and switches 120, 125. A positive input of the comparator 110 receives the feedback signal $V_B$ for generating the burst signal $S_{BT}$. A negative input of the comparator 110 is coupled to receive the threshold $V_T$. The burst signal $S_{BT}$ is generated by comparing the feedback signal $V_B$ with the threshold $V_T$. The threshold $V_T$ includes the hysteresis such as the first threshold $V_{TA}$ and the second threshold $V_{TB}$. The first threshold $V_{TA}$ is greater than the second threshold $V_{TB}$. In other words, the burst circuit 100 includes the threshold $V_T$ with the hystersis for generating the burst signal $S_{BT}$. The hystersis means that the burst signal $S_{BT}$ will be a high level once the feedback signal $V_B$ is higher than the first threshold $V_{TA}$ and the burst signal $S_{BT}$ will be a low level once the feedback signal $V_B$ is lower than the second threshold $V_{TB}$.

The hysteresis is developed by the switches 120, 125 and the inverter 115. The switch 120 is coupled between the first threshold $V_{TA}$ and the negative input of the comparator 110, and the switch 120 is controlled by the burst signal $S_{BT}$. The switch 125 is coupled between the second threshold $V_{TB}$ and the negative input of the comparator 110, and the switch 125 is controlled by the burst signal $S_{BT}$ via the inverter 115. The burst circuit 100 receives the feedback signal $V_B$ to generate the burst signal $S_{BT}$ for disabling the switching signal $S_{PWM}$ (shown in FIG. 2) when the level of the feedback signal $V_B$ is lower than the threshold $V_T$.

Figure 4:
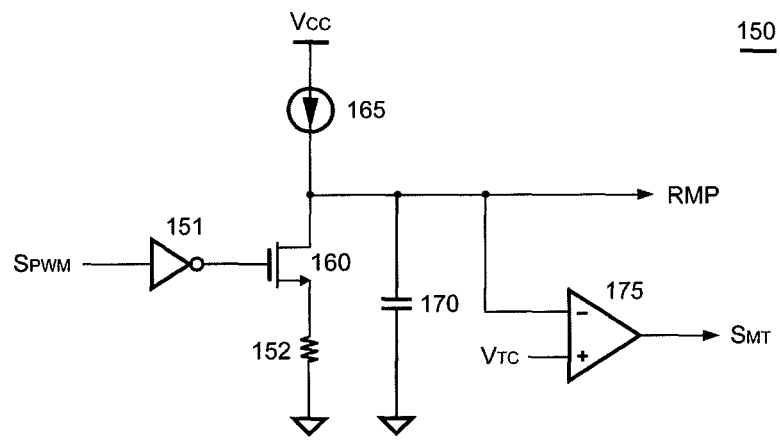
FIG. 4 shows a circuit diagram of a preferred embodiment of the ramp signal circuit in accordance with the present invention.

FIG. 4 is a circuit diagram of a preferred embodiment of the ramp signal circuit 150 according to the present invention. The ramp signal circuit 150 includes an inverter 151, a transistor 160, a resistor 152, a charge current 165, a capacitor 170 and a comparator 175. The transistor 160 can be an N-type transistor in accordance with one embodiment of the present invention. A gate terminal of the transistor 160 receives the switching signal $S_{PWM}$ through the inverter 151. A drain terminal of the transistor 160 is coupled to the supply voltage $V_{CC}$ via the charge current 165. The resistor 152 is coupled between a source terminal of the transistor 160 and the ground. The capacitor 170 generates the ramp signal RMP. A negative input of the comparator 175 is coupled to the drain terminal of the transistor 160 and one terminal of the capacitor 170 to receive the ramp signal RMP. The other terminal of the capacitor 170 is coupled to the ground.

A third threshold $V_{TC}$ is supplied with a positive input of the comparator 175. By comparing the ramp signal RMP with the third threshold $V_{TC}$, the maximum on-time signal $S_{MT}$ is generated at an output of the comparator 175. The capacitor 170 is charged by the charge current 165 once the switching signal $S_{PWM}$ is a high-level and the transistor 160 is turned off. The capacitor 170 is discharged via the resistor 152 once the switching signal $S_{PWM}$ is a low-level and the transistor 160 is turned on. When the ramp signal RMP is higher than the third threshold $V_{TC}$, the maximum on-time signal $S_{MT}$ will be a low-level and the maximum on-time of the switching signal $S_{PWM}$ will be limited. The ramp signal RMP and the maximum on-time signal $S_{MT}$ are generated in response to the switching signal $S_{PWM}$.

Figure 5:
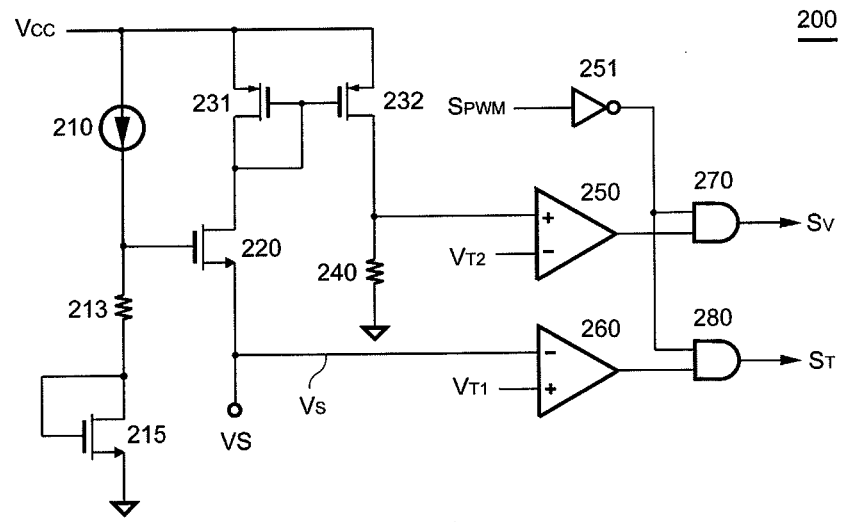
FIG. 5 shows a circuit diagram of a preferred embodiment of the detection circuit in accordance with the present invention.

FIG. 5 shows a circuit diagram of a preferred embodiment of the detection circuit 200 according to the present invention. The detection terminal VS is coupled to the transformer 10 shown in FIG. 1 through the resistors 31 and 32 to detect the waveform of the transformer 10. A voltage clamp circuit is developed to clamp a minimum voltage at the detection terminal VS. A current source 210, a resistor 213 and transistors 215, 220 form the voltage clamp circuit. The current source 210 is coupled between the supply voltage $V_{CC}$ and a gate terminal of the transistor 220. The resistor 213 is coupled between the gate terminal of the transistor 220 and a drain terminal of the transistor 215. A gate terminal of the transistor 215 and the drain terminal of the transistors 215 are connected together. A source terminal of the transistor 215 is coupled to the ground. A source terminal of the transistor 220 is coupled to the detection terminal VS. The threshold voltage of the transistor 215 is correlated to the threshold voltage of the transistor 220. The current of the current source 210 and the resistance of the resistor 213 determine the minimum voltage at the detection terminal VS.

A current detection circuit generates a current signal in response to the current sourced to the detection terminal VS. Transistors 231, 232 and a resistor 240 develop the current detection circuit for generating the current signal at the resistor 240. Source terminals of the transistors 231 and 232 are coupled to the supply voltage $V_{CC}$. Gate terminals of the transistors 231, 232 and drain terminals of the transistors 231, 220 are connected together. A drain terminal of the transistor 232 is coupled to a positive input of a comparator 250 and the resistor 240. The positive input of the comparator 250 receives the current signal. A threshold signal $V_{T2}$ is supplied with a negative input of the comparator 250. The comparator 250 generates the valley signal $S_V$ in response to the current signal through an AND gate 270. When the current signal is higher than the threshold signal $V_{T2}$, the comparator 250 will output a signal coupled to an input of the AND gate 270. Another input of the AND gate 270 is coupled to the switching signal $S_{PWM}$ via an inverter 251. The AND gate 270 will output the valley signal $S_V$. Therefore, the valley signal $S_V$ is generated only when the transformer 10 (shown in FIG. 1) is fully demagnetized and the switching signal $S_{PWM}$ is turned off.

A negative input of a comparator 260 is also coupled to the detection terminal VS to receive the detection voltage $V_S$. A threshold signal $V_{T1}$ is supplied with a positive input of the comparator 260. The comparator 260 generates the discharge-time signal $S_T$ in response to the detection voltage $V_S$. When the switching signal $S_{PWM}$ is turned off and the detection voltage $V_S$ of the detection terminal VS is lower than the threshold signal $V_{T1}$, the comparator 260 will output a signal coupled to an input of an AND gate 280. Another input of the AND gate 280 is coupled to the switching signal $S_{PWM}$ via the inverter 251. The AND gate 280 will output the discharge-time signal $S_T$. The discharge-time signal $S_T$ indicates the transformer 10 is fully demagnetized. The discharge-time signal $S_T$ is utilized to achieve the quasi resonant switching for the power converter.

Figure 6:
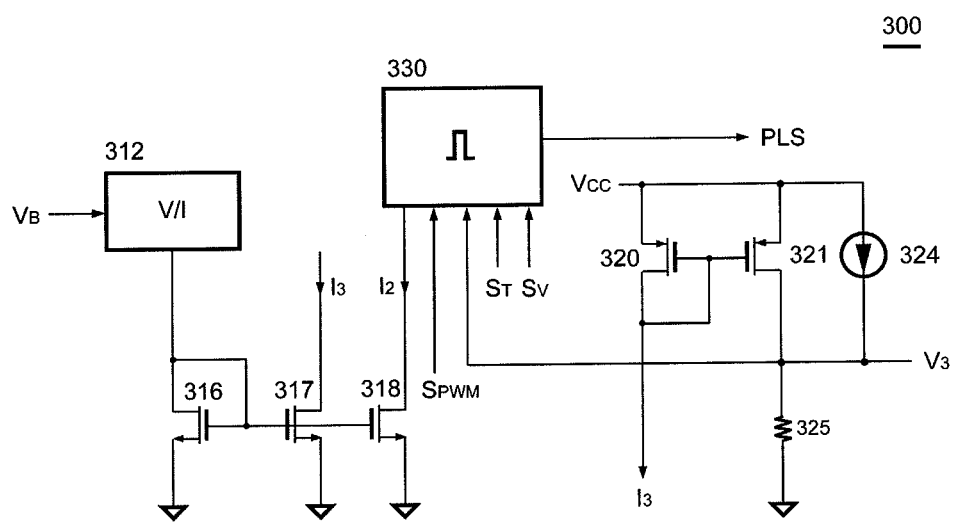
FIG. 6 is a circuit diagram of a preferred embodiment of the frequency variation circuit in accordance with the present invention.

FIG. 6 is a circuit diagram of a preferred embodiment of the frequency-variation circuit 300 according to the present invention. The frequency-variation circuit 300 includes a V-to-I converter (V/I) 312, a current-mirror circuit, a signal generation circuit 330 and a threshold generating circuit. The V-to-I converter 312 and the current-mirror circuit generate a current signal $I_2$ and a current signal $I_3$ in accordance with the feedback signal $V_B$. Transistors 316, 317 and 318 form the current-mirror circuit. Gate terminals of the transistors 316, 317, 318 and a drain terminal of the transistor 316 are coupled together. The drain terminal of the transistor 316 is further coupled to the V-to-I converter 312. The V-to-I converter 312 receives the feedback signal $V_B$. Source terminals of the transistors 316, 317, 318 are coupled to the ground. A current is generated at the drain terminal of the transistor 316 through the V-to-I converter 312 in accordance with the feedback signal $V_B$. The current signal $I_2$ and the current signal $I_3$ are generated at drain terminals of the transistor 317 and 318 respectively through the current-mirror circuit in response to the feedback signal $V_B$. The signal generation circuit 330 generates the frequency-variation signal PLS that is correlated to the current signal $I_2$. The current signal $I_2$ is correlated to the feedback signal $V_B$.

Transistors 320, 321, a current source 324 and a resistor 325 develop the threshold generating circuit. A drain terminal of the transistor 320 receives the current signal $I_3$. Gate terminals of the transistors 320, 321 and the drain terminal of the transistor 320 are coupled together. Source terminals of the transistors 320 and 321 are coupled to the supply voltage $V_{CC}$. The resistor 325 is coupled between a drain terminal of the transistor 321 and the ground. The current source 324 is connected between the supply voltage $V_{CC}$ and the resistor 325 to provide a minimum current for generating a threshold $V_3$. Therefore, the current signal $I_3$ is coupled to generate the threshold $V_3$. Transistors 320 and 321 receive the current signal $I_3$ for generating the threshold $V_3$ at the resistor 325. The threshold $V_3$ is produced in accordance with the level of the feedback signal $V_B$.

The signal generation circuit 330 receives the current signal $I_2$ and the threshold $V_3$. The frequency-variation circuit 300 is coupled to receive the switching signal $S_{PWM}$, the feedback signal $V_B$, the valley signal $S_V$ and the discharge-time signal $S_T$ for generating the frequency-variation signal PLS. The frequency-variation signal PLS is coupled to turn on the switching signal $S_{PWM}$ by clocking the flip-flop 80 (shown in FIG. 2).

Figure 7:
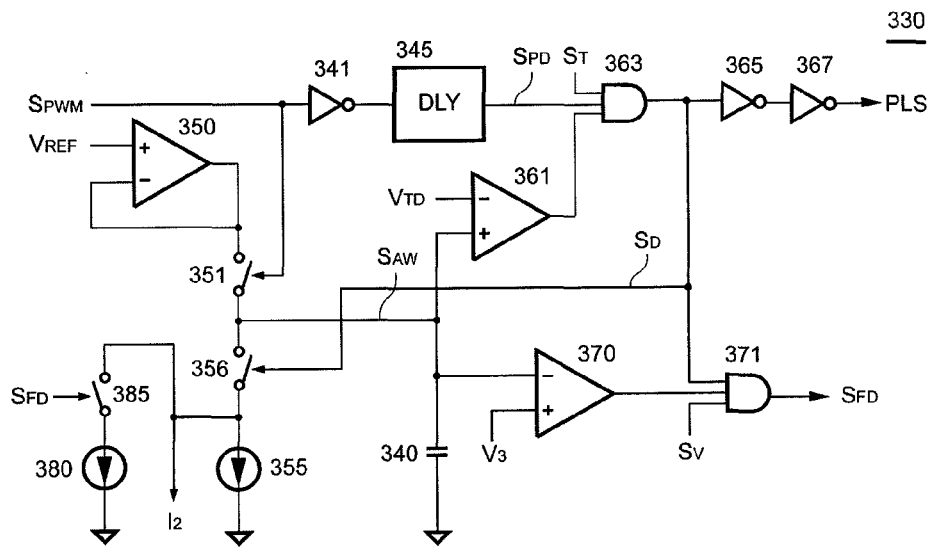
FIG. 7 shows a circuit diagram of a preferred embodiment of the signal generation circuit in accordance with the present invention.

FIG. 7 shows a circuit diagram of a preferred embodiment of the signal generation circuit 330 according to the present invention. A reference voltage $V_{REF}$ is coupled to charge a capacitor 340 through a switch 351. The reference voltage $V_{REF}$ is coupled to a positive input of an operational amplifier 350. A negative input of the operational amplifier 350 is coupled to an output of the operational amplifier 350. The switch 351 is coupled between the output of the operational amplifier 350 and the capacitor 340. A current source 355 is coupled to the ground to discharge the capacitor 340 via a switch 356. The switch 356 is coupled between the current source 355 and the capacitor 340. The switch 351 is controlled by the switching signal $S_{PWM}$. The switch 356 is controlled by a control signal $S_D$.

A negative input of the comparator 361 has a threshold $V_{TD}$ and its positive input is connected to the capacitor 340 for receiving a saw signal $S_{AW}$. A delay circuit (DLY) 345 receives the switching signal $S_{PWM}$ via an inverter 341 for generating a delay signal $S_{PD}$. The delay signal $S_{PD}$ provides a delay time for the switching signal $S_{PWM}$ when the switching signal $S_{PWM}$ is off, which limits the maximum switching frequency of the switching signal $S_{PWM}$. A first input of an AND gate 363 receives the discharge-time signal $S_T$. A second input of the AND gate 363 receives the delay signal $S_{PD}$. A third input of the AND gate 363 is coupled to an output of the comparator 361. The AND gate 363 is coupled to receive the discharge-time signal $S_T$, the delay signal $S_{PD}$ and an output signal of the comparator 361 for generating the control signal $S_D$. The control signal $S_D$ is for generating the frequency-variation signal PLS through inverters 365 and 367. The inverter 365 is coupled between the output of the AND gate 363 and an input of the inverter 367. An output of the inverter 367 generates the frequency-variation signal PLS. The frequency-variation signal PLS is generated and the switching signal $S_{PWM}$ is off during the discharge period of the capacitor 340.

A negative input of a comparator 370 receives the saw signal $S_{AW}$. The threshold $V_3$ is supplied with a positive input of the comparator 370 to compare with the saw signal $S_{AW}$ for generating a fast-discharge signal $S_{FD}$ at an output of an AND gate 371. A first input of the AND gate 371 receives the control signal $S_D$. An output of the comparator 370 is coupled to a second input of the AND gate 371. A third input of the AND gate 371 receives the valley signal $S_V$. The output of the AND gate 371 generates the fast-discharge signal $S_{FD}$ in response to the control signal $S_D$, the output of the comparator 370 and the valley signal $S_V$. Switches 385, 356, constant current 380, the current source 355 and the current signal $I_2$ are for modulating the discharge current of the capacitor 340.

The switch 385 connected to the constant current 380, the current signal $I_2$ and the current source 355 are coupled together in parallel, which is connected to the switch 356 in series. The constant current 380 is coupled between the ground and a first terminal of the switch 385. A second terminal of the switch 385 is coupled to the current signal $I_2$ and the current source 355. The current signal $I_2$ is correlated the feedback signal $V_B$ (shown in FIG. 6). The discharge current of the capacitor 340 is thus decreased in response to the decrease of the feedback signal $V_B$. In other words, the saw signal $S_{AW}$ is generated in accordance with a level of the feedback signal $V_B$. Therefore, the discharge time of the saw signal $S_{AW}$ is increased in response to the decrease of the feedback signal $V_B$. Because the switching signal $S_{PWM}$ is off during the discharge time of the saw signal $S_{AW}$, the off-time of the switching signal $S_{PWM}$ is increased in response to the decrease of the feedback signal $V_B$.

The switch 385 is controlled by the fast-discharge signal $S_{FD}$. Since the current level of the current source 380 is high, the capacitor 340 will be immediately discharged once the fast-discharge signal $S_{FD}$ is enabled. Therefore, the valley signal $S_V$ is coupled to trigger and turn on the frequency-variation signal PLS when the fast-discharge signal $S_{FD}$ is enabled.

Figure 8:
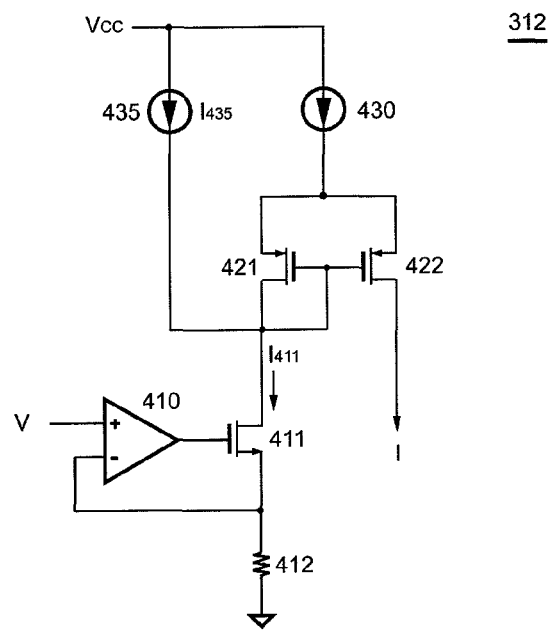
FIG. 8 is a circuit diagram of a preferred embodiment of the V-to-I converter in accordance with the present invention.

FIG. 8 shows a circuit diagram of a preferred embodiment of the V-to-I converter 312 according to the present invention. The V-to-I converter 312 includes an operational amplifier 410, a transistor 411, a resistor 412, a first current source 435, a second current source 430 and a current-mirror circuit formed by transistors 421 and 422. A positive input of the operational amplifier 410 receives an input voltage V. The input voltage V is the feedback signal $V_B$ (shown in FIG. 6) in accordance with one embodiment of the present invention. An output of the operational amplifier 410 is coupled to a gate terminal of the transistor 411 to drive the transistor 411. A negative input of the operational amplifier 410 is connected to a source terminal of the transistor 411. The resistor 412 is connected from the source terminal of the transistor 411 to the ground. The current of the transistor 411 will flow through the resistor 412. A drain terminal of the transistor 411 is coupled to the current-mirror circuit and coupled to the supply voltage $V_{CC}$ through the first current source 435.

The first current source 435 is coupled between the drain terminal of the transistor 411 and the supply voltage $V_{CC}$. A current $I_{411}$ is located on the drain terminal of the transistor 411. Once the current $I_{411}$ of the transistor 411 is higher than the current $I_{435}$ of the first current source 435, a current $(I_{411}-I_{435})$ will flow through the current mirror circuit developed by the transistors 421 and 422. Source terminals of the transistors 421 and 422 of the current-mirror circuit are coupled to the supply voltage $V_{CC}$ through the second current source 430. Gate terminals of the transistors 421, 422 and drain terminals of the transistors 421, 411 are connected together. The maximum current of this current source is limited by the second current source 430. A drain terminal of the transistor 422 generates an output current I correlated to the input voltage V.

Figure 9:
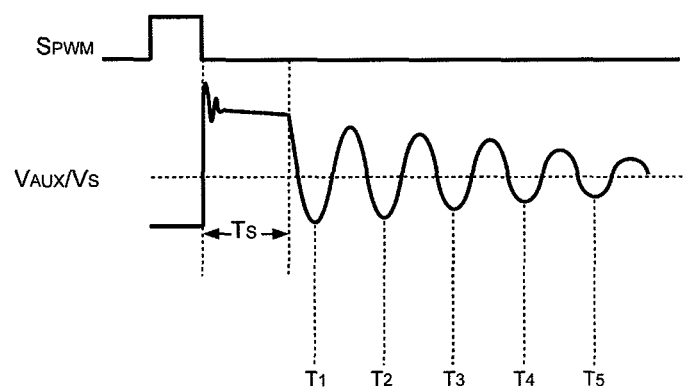
FIG. 9 shows the waveforms of the switching signal and the reflected voltage in accordance with the present invention.

FIG. 9 shows the waveforms of the switching signal $S_{PWM}$ and the reflected voltage $V_{AUX}$ according to the present invention. The reflected voltage $V_{AUX}$ is generated at the detection terminal VS of the control circuit 50 (shown in FIG. 1). The period $T_S$ shows the demagnetizing time of the transformer 10 (shown in FIG. 1). It is related to the discharge-time signal $S_T$ (shown in FIG. 2). For the quasi-resonant operation, the switching signal $S_{PWM}$ would be turned on at the timing $T_1$, $T_2$, $T_3$, $T_4$ or $T_5$, depends on the load conditions. If the load condition is a heavy load, the turn-on time could be the timings $T_1$ or $T_2$. If the load condition is a light load, the turn-on time could be the timings $T_3$, $T_4$, or $T_5$.

Figure 10A:
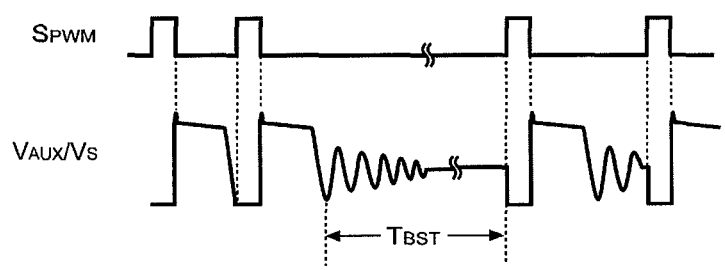
FIG. 10A shows the waveforms of the switching signal and the reflected voltage of the power converter operated at the burst mode in accordance with the present invention.
Figure 10B:
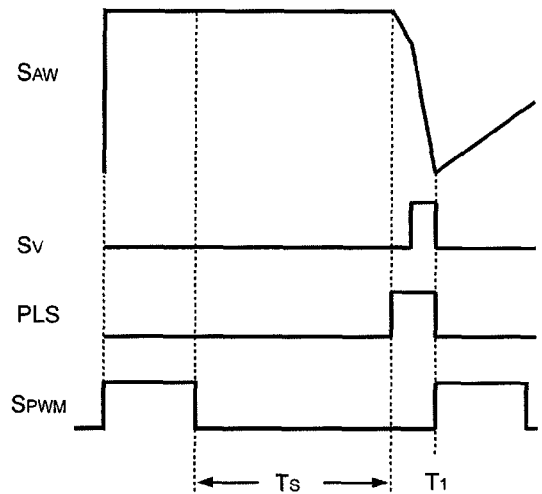
FIG. 10B shows the waveforms of the saw signal, the valley signal, the frequency-variation signal and the switching signal, and the power converter is operated at the quasi-resonant and the valley switching for the heavy load in accordance with the present invention.

FIG. 10A shows the waveforms of the switching signal $S_{PWM}$ and the reflected voltage $V_{AUX}$ of power converter operated at burst mode according to the present invention. When the level of the feedback signal $V_B$ is lower than the threshold $V_T$ (shown in FIG. 3), the burst signal $S_{BT}$ is generated for disabling the switching signal $S_{PWM}$. That is, the switching signal $S_{PWM}$ will be disabled once the burst signal $S_{BT}$ is enabled and also keeps a low level. Once the switching signal $S_{PWM}$ is not disabled by the burst signal $S_{BT}$, the switching signal $S_{PWM}$ will be enabled at the timings $T_1$ or $T/$, etc. for reducing the switching loss. A burst period $T_{BST}$ is shown in the burst mode operation. FIG. 10B shows the waveforms of the saw signal $S_{AW}$, the valley signal $S_V$, the frequency-variation signal PLS and the switching signal $S_{PWM}$, and the power converter is operated at quasi-resonant and valley switching for the heavy load according to the present invention. The switching signal $S_{PWM}$ is turned on at the timing $T_1$. At the timing $T_1$, the valley signal $S_V$ and the frequency-variation signal PLS are a low level. The period $T_S$ shows the demagnetizing time of the transformer 10.

Figure 10C:
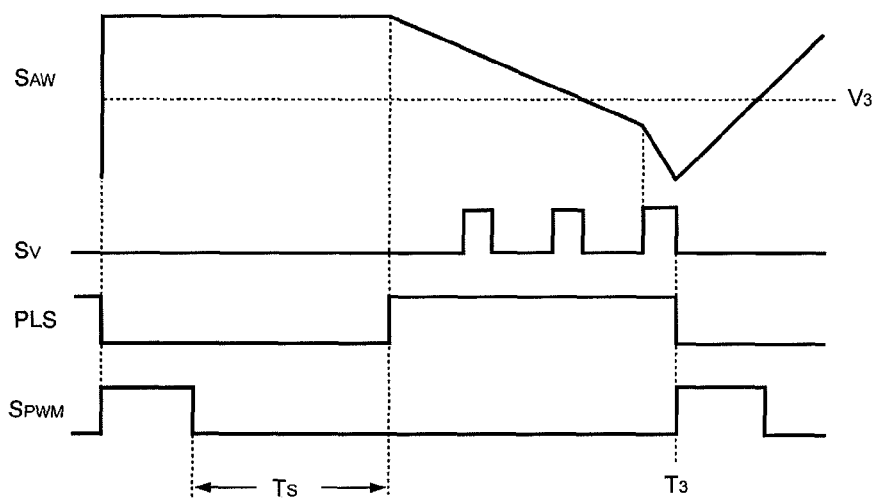
FIG. 10C shows the waveforms of the saw signal, the valley signal, the frequency-variation signal and the switching signal, and the power converter is operated at the quasi-resonant and the extended valley switching for the light load in accordance with the present invention.

FIG. 10C shows the waveforms of the saw signal $S_{AW}$, the valley signal $S_V$, the frequency-variation signal PLS and the switching signal $S_{PWM}$, and the power converter is operated at quasi-resonant and extended valley switching for the light load according to the present invention. For example, the switching signal $S_{PWM}$ is turned on at the timing $T_3$. The threshold $V_3$ is produced in accordance with the feedback signal $V_B$ (shown in FIG. 6). The discharge time of the saw signal $S_{AW}$ and the off time of the switching signal $S_{PWM}$ are increased in response to the decrease of the feedback signal $V_B$.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control circuit for a power converter, comprising:
 a PWM circuit generating a switching signal coupled to switch a transformer of the power converter;
 a feedback input circuit coupled to an output of the power converter for generating a feedback signal, in which the feedback signal is coupled to turn off the switching signal;
 a detection circuit coupled to the transformer for generating a valley signal in response to a waveform of the transformer;
 a frequency-variation circuit coupled to receive the feedback signal and the valley signal for generating a frequency-variation signal, in which the frequency-variation signal is coupled to turn on the switching signal; and
 a burst circuit coupled to receive the feedback signal for generating a burst signal to disable the switching signal;
 wherein the feedback signal is correlated to an output load of the power converter.

2. The control circuit as claimed in claim 1, wherein the detection circuit is coupled to the transformer through at least one resistor for generating the valley signal.

3. The control circuit as claimed in claim 1, wherein the burst circuit includes a threshold having a hysteresis for generating the burst signal.

4. The control circuit as claimed in claim 1, wherein the frequency-variation circuit comprises a signal generation circuit for generating a saw signal in accordance with a level of the feedback signal, a threshold is coupled to compare with the saw signal for generating a fast-discharge signal, and the valley signal is coupled to turn on the frequency-variation signal when the fast-discharge signal is enabled.

5. The control circuit as claimed in claim 1, wherein an off time of the switching signal is increased in response to the decrease of the feedback signal.

6. The control circuit as claimed in claim 1, wherein a maximum switching frequency of the switching signal is limited.

7. The control circuit as claimed in claim 1, wherein the PWM circuit comprises:
 a comparator coupled to receive the feedback signal and a ramp signal for generating a reset signal; and
 a flip-flip coupled to receive the frequency-variation signal for turning on the switching signal;
 wherein the switching signal is switched off in response to the reset signal, the ramp signal is generated in response to the switching signal.

8. The control circuit as claimed in claim 1, wherein the detection circuit comprises:
 a detection terminal coupled to the transformer to detect the waveform of the transformer;
 a voltage clamp circuit clamping a minimum voltage at the detection terminal;
 a current detection circuit generating a current signal in response to a current sourced to the detection terminal; and
 a comparator generating the valley signal in response to the current signal;
 wherein the valley signal is generated only when the switching signal is off.

9. The control circuit as claimed in claim 1, wherein the detection circuit further generates a discharge-time signal in response to the waveform of the transformer, the discharge-time signal is coupled to the frequency-variation circuit for generating the frequency-variation signal, the discharge-time signal indicates the transformer is fully demagnetized.

10. A method for controlling a QR power converter, comprising:
 generating a switching signal coupled to switch a transformer of the power converter;
 generating a feedback signal in accordance with an output of the power converter, in which the feedback signal is coupled to turn off the switching signal;
 generating a valley signal in response to a waveform of the transformer during an off time of the switching signal;
 generating a frequency-variation signal in response to the feedback signal and the valley signal, in which the frequency-variation signal is coupled to turn on the switching signal; and
 generating a burst signal in accordance with the feedback signal, in which the burst signal is coupled to disable the switching signal.

11. The method as claimed in claim 10, wherein the burst signal is generated by comparing the feedback signal and a threshold, and the threshold includes a hysteresis for generating the burst signal.

12. The method as claimed in claim 10, wherein the valley signal is generated through a voltage divider coupled to the transformer.

13. The method as claimed in claim 10, wherein the valley signal is generated after the transformer is fully demagnetized.

14. The method as claimed in claim 10, further comprising:
 generating a threshold and a saw signal in accordance with a level of the feedback signal, wherein the threshold is coupled to compare with the saw signal for generating a fast-discharge signal, wherein the valley signal is coupled to turn on the frequency-variation signal when the fast-discharge signal is enabled.

15. The method as claimed in claim 14, wherein a discharge time of the saw signal is increased in response to the decrease of the feedback signal, the switching signal is off during the discharge time of the saw signal.

16. The method as claimed in claim 10, further comprising:
generating a discharge-time signal in response to the waveform of the transformer, wherein the discharge-time signal is for generating the frequency-variation signal, and the discharge-time signal indicates the transformer is fully demagnetized.

17. The method as claimed in claim 10, wherein the off time of the switching signal is increased in response to the decrease of the feedback signal.

18. The method as claimed in claim 10, wherein a maximum on-time of the switching signal is limited.

* * * * *